H. GASSTROM.
RULE.
APPLICATION FILED DEC. 22, 1909.
978,446.
Patented Dec. 13, 1910.
2 SHEETS—SHEET 1.
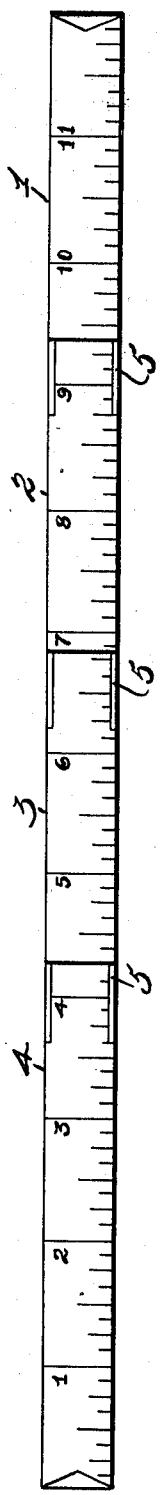
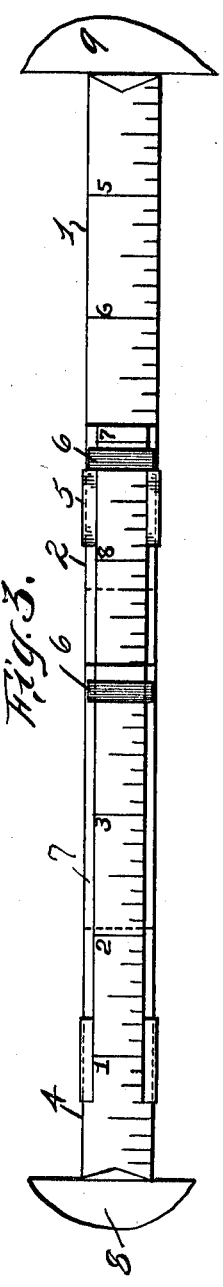
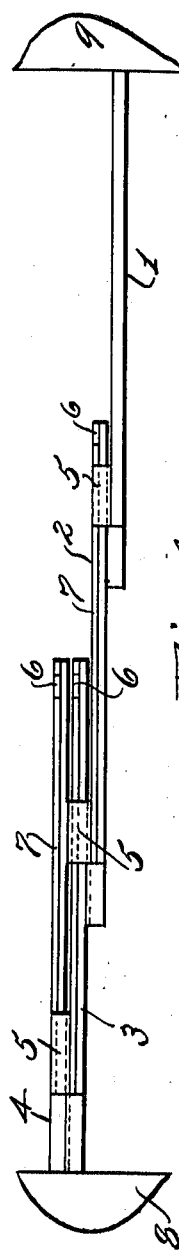
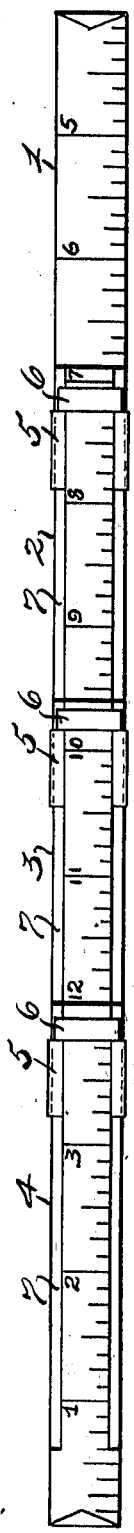
Witnesses
C. A. Jarvis
Kate H. Jarvis
Inventor:
Herman Gasstrom
by Chrystie and Wright
attorneys.

H. GASSTROM.
RULE.
APPLICATION FILED DEC. 22, 1909.
978,446.
Patented Dec. 13, 1910.
2 SHEETS—SHEET 2.
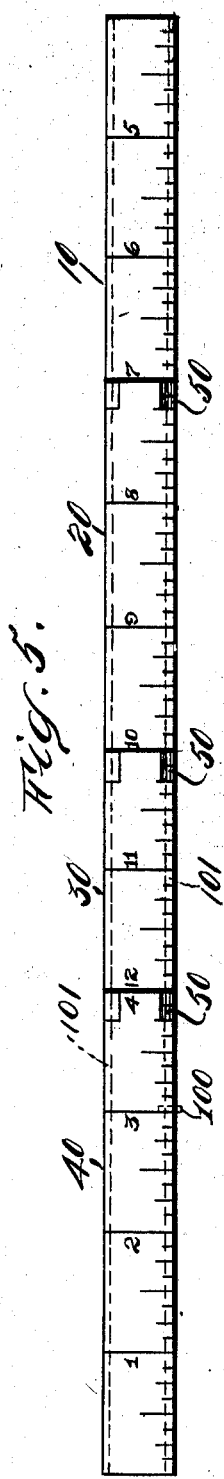
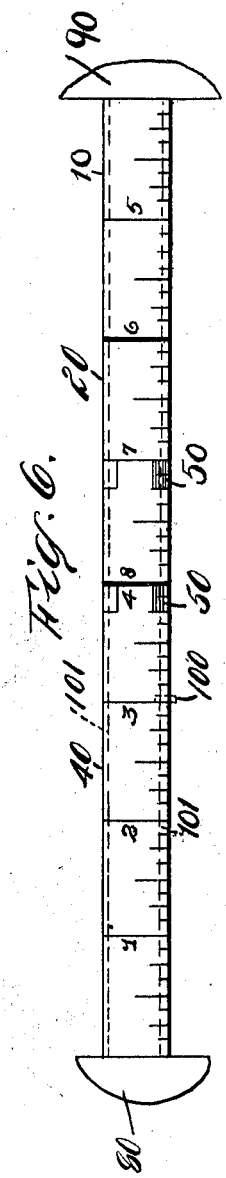
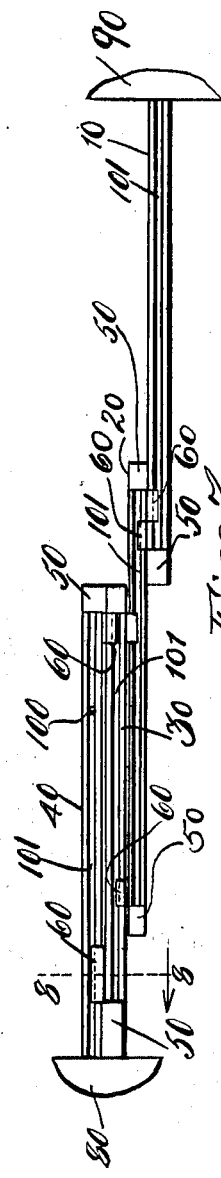
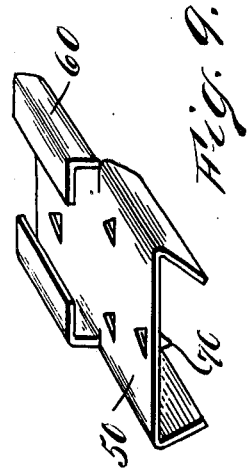
Witnesses:
C. A. Jarvis
Benjamin Ottenburg
Inventor:
Herman Gasstrom
by Chrystie and Wright
attorneys.

UNITED STATES PATENT OFFICE.

HERMAN GASSTROM, OF NEW YORK, N. Y., ASSIGNOR TO DAHL MANUFACTURING COMPANY, OF NEW YORK, N. Y., A CORPORATION OF NEW YORK.

RULE.

978,446.  Specification of Letters Patent.  Patented Dec. 13, 1910.

Application filed December 22, 1909. Serial No. 534,461.

*To all whom it may concern:*

Be it known that I, HERMAN GASSTROM, a subject of the Czar of Russia, residing at New York city, in the borough of Manhattan, county and State of New York, have invented certain new and useful Improvements in Rules, of which the following is a clear, full, and exact description.

This invention relates to extending foot rules.

The object of the invention is primarily to secure a rule which may be extended between two given points, and a direct reading of the measured distance got from the rule.

It also refers to particular improvements in construction of a rule of such description.

In carrying out the invention, I make use of terminal sections, and a plurality of intermediate sections, all of the same length, and sliding one upon another. The sections may be so marked on one side that when the rule is fully extended it will appear as an ordinary rule so far as the reading is concerned, while its reversed side is so scaled that one may readily read and directly read the distance which the rule has been extended. To secure this result, one terminal end, preferably the left end, is marked with inch or other marks equal to its length, for instance, for a four inch length, while the other terminal section is marked 5, 6, etc., being marked the sum of the left hand section plus the position of marking on the right hand section, the intermediate sections are numbered consecutively with the right hand section. In using the rule, one first slides section No. 2 out to its full end, then slides section No. 3 out to its full end, etc., until the butt end or left hand end of the rule touches the other side of the object to be measured. Thereupon, by reading at the right hand end of the section or sections last extended, a direct reading of the rule may be secured.

The scope of this invention will be pointed out in the claim.

In the accompanying drawings: Figure 1 is a plan view of one form of rule constructed in accordance with my invention, showing it marked as an ordinary rule. Fig. 2 is a reversed view of the same rule, marked as herein described. Fig. 3 is a plan view of the rule as used in measuring between objects. Fig. 4 is a side elevation of Fig. 3. Fig. 5 is a plan of one side of a modified form of rule. Fig. 6 is a plan of the same when partially collapsed between two abutments. Fig. 7 is a side elevation of Fig. 6. Fig. 8 is a detailed section on line 8—8 Fig. 7. Fig. 9 is a perspective view of the end clamp and guide piece.

In the drawings, Figs. 1 to 4, I have shown one form of my improved rule. It consists of a left hand terminal section 4, a right hand terminal section 1, and two intermediate sections 2 and 3. In this instance, each section is four inches long. The sides of each section are provided with surface grooves 7, and overlapping fingers 5 of sliding clamps secured at the end of each intermediate section are provided to engage therewith. Stops 6 preferably of metal, are also provided, against which the sliding clamps 5 may abut when the rule is extended. The rule is marked on one side in this instance, as it is a four-inch rule, so as to measure 1, 2, 3 and 4 on the left hand section, and 5, 6 on the right hand section, being in each instance the sum of the extended section. The intermediate sections are successively numbered from the right hand section. As a result of this marking, when the rule is extended as shown in Figs. 3 and 4, the distance between the abutments 8 and 9 to be measured will appear at the end of the last members extended. In the examples shown, sections 4 and 3 lie superposed, and at their right hand end one may be able to read the distance between the abutments or length of the rule in that position. In the example shown in Fig. 3, such distance would be 8⅜ inches.

As shown in Figs. 5 to 9, in order to provide a rule which, when closed, will have both of its ends secure and incapable of being opened fan-wise, I provide each end of the intermediate sections and each inner end of the extreme sections with a clamp 50 secured to the face of the rule by prongs 70, jammed therein by any suitable instrument. This clamp has an extended part provided with inturned guide pieces 60 engaging grooves 101 in the edges of the adjoining sections, and sliding therein. A guide 60, when pulled to the extreme length of the rule, will strike against the guide 60 of the adjoining rule section at the opposite end, which will act as a stop. The rule of this modification is used in the same manner as that described with reference to Figs. 1 to 4, but a plainer and easier reading of the characters is secured in view of the construction of the clamp and guide. It also secures the advantage of preventing one end of the rule from being opened fan-wise. This rule is composed of sections 10, 20, 30 and 40, and it may measure the distance between abutments 80 and 90 as shown. Its scale is marked in a similar manner to that shown in Figs. 1 to 4. A stop pin 100 is preferably provided in slot 101 of the section 40 for the purpose of limiting the extreme limit of the rule shown to one foot.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense. It is furthermore desired to be understood that the language used in the following claim is intended to cover all the generic and specific features of the invention herein described, and all statements of the scope of the invention which as a matter of language might be said to fall therebetween.

I claim as my invention:

The herein described sliding rule composed of end sections, a plurality of intermediate sections, each section of flat lengths superposed one on the other, each section sliding upon the adjoining section in a straight line, each section of the same length, marking for said rule consisting of the following divisions: one terminal section marked at the end division with numerals equal to the length of the other terminal section plus the position such numerals occupy on the marked section, from the end, the intermediate sliding sections being marked consecutively to the said marked terminal section, whereby a direct reading can be secured upon the marked section or the intermediate sections from the end of the last section which is slid longitudinally, grooves at the sides of the sections, metal end pieces, secured to the sections, having turned ends engaging said grooves in the adjoining section.

Signed at New York city this 21st day of December 1909.

HERMAN GASSTROM.

Witnesses:
F. WARREN WRIGHT,
BENJAMIN O. KSENKRUG.